(12) United States Patent
Dagher et al.

(10) Patent No.: US 12,153,153 B2
(45) Date of Patent: Nov. 26, 2024

(54) LOCATING DEVICE

(71) Applicant: INRIA INSTITUT NATIONAL DE RECHERCHE EN INFORMATIQUE ET EN AUTOMATIQUE, Le Chesnay (FR)

(72) Inventors: Roudy Dagher, Lille (FR); Gang Zheng, Lille (FR); Alban Quadrat, Gif sue Yvette (FR)

(73) Assignee: INRIA INSTITUT NATIONAL DE RECHERCHE EN INFORMATIQUE ET EN AUTOMATIQUE, Lechesnay (FR)

(*) Notice: Subject to any disclaimer, the term of this patent is extended or adjusted under 35 U.S.C. 154(b) by 646 days.

(21) Appl. No.: 17/049,900

(22) PCT Filed: Apr. 18, 2019

(86) PCT No.: PCT/FR2019/050930
§ 371 (c)(1),
(2) Date: Dec. 16, 2021

(87) PCT Pub. No.: WO2019/207238
PCT Pub. Date: Oct. 31, 2019

(65) Prior Publication Data
US 2022/0113367 A1    Apr. 14, 2022

(30) Foreign Application Priority Data
Apr. 23, 2018  (FR) ...................... 1853553

(51) Int. Cl.
*G01S 5/02* (2010.01)
*G06F 17/16* (2006.01)
(52) U.S. Cl.
CPC ............ *G01S 5/0289* (2013.01); *G06F 17/16* (2013.01)

(58) Field of Classification Search
CPC ..................................................... G01S 5/0289
See application file for complete search history.

(56) References Cited

U.S. PATENT DOCUMENTS

2010/0171657 A1    7/2010  Liu
2014/0011518 A1*   1/2014  Valaee ............... G01S 5/02526
                                                      455/456.1
(Continued)

FOREIGN PATENT DOCUMENTS

CN    102186242 A    9/2011
CN    112424628 A    2/2021
(Continued)

OTHER PUBLICATIONS

International Search Report and Written Opinion received for International Patent Application No. PCT/FR2019/050930, mailed on Jul. 17, 2019, 20 pages including English translation.
International preliminary report on patentability received for International Patent Application No. PCT/FR2019/050930, mailed on Nov. 5, 2020, 16 pages including English translation.
(Continued)

*Primary Examiner* — Curtis B Odom
(74) *Attorney, Agent, or Firm* — David D. Brush; Westman, Champlin & Koehler, P.A.

(57) ABSTRACT

A locating device, which includes a memory arranged to receive data concerning the distance between a plurality of anchors and one or more mobile sources at a plurality of locations different to each other. The locating device includes a decomposer, a reducer, and a solver arranged to return a matrix of coordinates of the anchors and a matrix of coordinates of the locations.

11 Claims, 1 Drawing Sheet

(56) References Cited

U.S. PATENT DOCUMENTS

2015/0201309 A1    7/2015   Liu
2016/0091341 A1    3/2016   Fleureau et al.

FOREIGN PATENT DOCUMENTS

| EP | 1617601 A2 | 1/2006 |
| EP | 2785124 A1 | 10/2014 |
| EP | 3001217 A1 | 3/2016 |
| EP | 3785040 A1 | 10/2019 |
| FR | 3080447 A1 | 10/2019 |
| JP | 2011-209284 A | 10/2011 |
| JP | 2014-190980 A | 10/2014 |
| JP | 2021-522584 A | 8/2021 |
| KR | 2021-0003850 A | 1/2021 |
| WO | 2019/207238 A1 | 10/2019 |

OTHER PUBLICATIONS

Notice of Reasons for Refusal received for Japanese Patent Application No. 2020-559438, mailed on Apr. 11, 2023, 06 pages including English translation.

Search Report received for Japanese Patent Application No. 2020-559438, mailed on Mar. 23, 2023, 21 pages including English translation.

Yue Wang, et al., "Anchor-Based Three-Dimensional Localization Using Range Measurements," 2012 8th International Conference on Wireless Communications, Networking, and Mobile Computing, Sep. 1, 2012, pp. 1-5.

Chinese Search Report dated Jan. 29, 2024, for corresponding Chinese Application No. 2019800429249.

Gao X. et al., "Self-localization Algorithm with Constraints Based on Weighted Bilinear Approach," Computer Engineering, vol. 42, No. 4, Apr. 2016.

\* cited by examiner

LOCATING DEVICE

The invention relates to the field of localization and more particularly to the localization of mobile sources in an environment provided with anchors.

The field of localization has been particularly prolific for the last fifteen years. With the development of GPS, geolocalization has undergone ever-increasing usage, with more and more applications centred around use thereof.

However, GPS poses problems of availability and power consumption. For this reason, the field of localization by signal processing, for example, on the basis of exchanges with Wi-Fi stations, relay antennas, or even with beacons, has undergone an outstanding expansion.

Most solutions relate to triangulation and have quite low accuracy and/or strong constraints, such as accurate knowledge of absolute positions of reference.

The invention improves the situation. To this end, the invention proposes a locating device comprising:

a memory arranged to receive data concerning the distance between a plurality of anchors and one or more mobile sources at a plurality of locations different from one another, the number of anchors and the number of locations of one satisfying the criteria that one must be higher than four and is designated as the primary number and the other one must be higher than ten and is designated as the secondary number, a decomposer arranged to access the distance data and to calculate a singular value decomposition of a matrix formed by the product of the Euclidean distance matrix derived from the distance data multiplied by two square matrices, one of which has a dimension equal to the primary number squared and has a first line made up of null elements, a first column the elements of which are equal to minus one except the first element which is null, the other elements forming an identity matrix which order is equal to the primary number minus one, and the other is the transpose of a matrix with a dimension equal to the secondary number squared having a first row of null elements, a first column the elements of which are equal to minus one except the first element which is null, the other elements forming an identity matrix which order is equal to the secondary number minus one, a reducer arranged to calculate a resolution vector minimising, according to the least squares method, the difference between the product of a simplification matrix multiplied by the resolution vector and a matrix formed by the product of the Euclidean distance matrix derived from the distance data multiplied by a vector in which all the elements are equal to one except the first element which is null, and by a vector in which all the elements are null except the first which is equal to one, the simplification matrix being derived from the multiplication between the Khatri-Rao product by line partitioning of the first matrix of the singular value decomposition performed by the decomposer with itself and a replication matrix having a dimension equal to three, concatenated with twice the opposite of the first matrix of the singular value decomposition performed by the decomposer, a solver arranged to derive an inversion vector from the last three elements of the resolution vector and an inversion matrix formed from the other elements of the resolution vector, in order to determine a transformation matrix such that the inversion matrix is equal to the product of the transformation matrix multiplied by its transpose, and to return a matrix of coordinates of the anchors and a matrix of coordinates of the locations from the transformation matrix, the inversion vector, the first matrix of the singular value decomposition performed by the decomposer and the product of the second matrix and the third matrix of the singular value decomposition performed by the decomposer.

This device is particularly advantageous because it makes it possible to locate one or more mobile sources very quickly with low constraints with respect to the existing one.

In various variants, the device may have one or more of the following features:

the solver is arranged to determine the transformation matrix as the aggregation of three three-dimensional vectors, the first of which is the inversion vector divided by the distance between the first anchor and the first mobile source, the second of which is derived from a vector of singular values of a matrix calculated from the second line of the first matrix of the singular value decomposition performed by the decomposer, the inversion vector and the inversion matrix, and the third of which is calculated from the second line of the first matrix of the singular value decomposition performed by the decomposer, the inversion vector and the transformation matrix, the solver is arranged to determine the transformation matrix as the aggregation of three three-dimensional vectors, the first of which is the inversion vector divided by the distance between the first anchor and the first mobile source, the second of which is calculated from the second line of the first matrix of the singular value decomposition performed by the decomposer, the inversion vector and the inversion matrix, and the third of which is derived from a singular values vector of a matrix calculated from the second line of the first matrix of the singular value decomposition performed by the decomposer, the inversion vector and the inversion matrix, the solver is arranged to determine the transformation matrix as the aggregation of three three-dimensional vectors, the first of which is calculated from the inversion matrix and the second row of the first matrix of the singular value decomposition performed by the decomposer, the second of which is calculated from the inversion matrix, the second line of the first matrix of the singular value decomposition performed by the decomposer and the third line of the first matrix of the singular value decomposition performed by the decomposer, and the third of which is formed from the inversion matrix and the cross product between the transpose of the second line of the first matrix of the singular value decomposition performed by the decomposer and the transpose of the third line of the first matrix of the singular value decomposition performed by the decomposer, and the solver is further arranged to calculate a reference frame change matrix between the coordinates of three anchors in an absolute reference frame and the coordinates of these three anchors in the coordinate matrix of the anchors determined by the solver, and to return an absolute coordinate matrix of the locations from the reference frame change matrix and the coordinate matrix of the locations determined by the solver.

The invention also relates to a computer-implemented locating method comprising the following operations:

a) receiving data concerning the distance between a plurality of anchors and one or more mobile sources at a plurality of locations different from one another, the number of anchors and the number of locations satisfying the criteria that one must be higher than four and is designated as the primary number and the other one must be higher than ten and is designated as the secondary number, b) calculating a singular value decomposition of a matrix formed by the product of the Euclidean distance matrix derived from the distance data multiplied by two square matrices, one of which has a dimension equal to the primary number squared and has a first line made up of null elements, a first column the elements of which are equal to minus one except the first element which is null, the other elements forming an identity matrix which order is equal to the primary number minus one, and the other is the transpose of a matrix with a dimension equal to the secondary number squared having a first row of null elements, a first column the elements of which are equal to minus one except the first element which is null, the other elements forming an identity matrix which order is equal to the secondary number minus one, c) calculating a resolution vector minimising, according to the least squares method, the difference between the product of a simplification matrix multiplied by the resolution vector and a matrix formed by the product of the Euclidean distance matrix derived from the distance data multiplied by a vector of which all the elements are equal to one except the first element which is null, and by a vector of which all the elements are null except the first which is equal to one, the simplification matrix being derived from multiplication between the Khatri-Rao product by line partitioning of the first matrix of the singular value decomposition of the operation b) with itself and a three-dimensional duplication matrix, horizontally concatenated with twice the opposite of the first matrix of the singular value decomposition of the operation b), d) deriving an inversion vector from the last three elements of the resolution vector and an inversion matrix formed from the other elements of the resolution vector, e) determining a transformation matrix such that the inversion matrix is equal to the product of the transformation matrix multiplied by its transpose, and f) returning a matrix of coordinates of the anchors as well as a matrix of coordinates of the locations from the transformation matrix, the inversion vector, the first matrix of the singular value decomposition of the operation b) and the product of the second matrix and the third matrix of the singular value decomposition of the operation b).

In various variants, the method may include one or more of the following operations:

operation e) determination of the transformation matrix as the aggregation of three three-dimensional vectors, the first of which is the inversion vector divided by the distance between the first anchor and the first mobile source, the second of which is derived from a vector of singular values of a matrix calculated from the second line of the first matrix of the singular value decomposition of the operation b), the inversion vector and the inversion matrix, and the third of which is calculated from the decomposition of the operation b), the inversion vector and the inversion matrix, operation e) determining the transformation matrix as the aggregation of three three-dimensional vectors, the first of which is the inversion vector divided by the distance between the first anchor and the first mobile source, the second of which is calculated from the second line of the first matrix of the singular value decomposition of the operation b), the inversion vector and the inversion matrix, and the third of which is derived from a singular values vector of a matrix calculated from the second line of the first matrix of the singular value decomposition of the operation b), the inversion vector and the inversion matrix, operation e) determining the transformation matrix as the aggregation of three three-dimensional vectors, the first of which is calculated from the inversion matrix and the second row of the first matrix of the singular value decomposition of the operation b), the second of which is calculated from the inversion matrix, the second row of the first matrix of the singular value decomposition of the operation b) and the third line of the first matrix of the singular value decomposition of the operation b), and the third of which is formed from the inversion matrix and the vector product between the transpose of the second line of the first matrix of the singular value decomposition of the operation b) and the transpose of the third line of the first matrix of the singular value decomposition of the operation b), and the method further comprises the following:

g) calculating a reference frame change matrix between the coordinates of three anchors in an absolute reference frame and the coordinates of these three anchors in the anchor coordinate matrix determined by the solver, and returning an absolute coordinate matrix of the locations from the reference frame change matrix and the coordinate matrix of the mobile sources determined by the solver.

Finally, the invention relates to a computer program product comprising program code portions for implementing the device or method as described above when said program is executed on a computer.

Other features and advantages of the invention will appear more readily on reading the following description, drawn from examples given by way of non-limiting examples, drawn from the drawings, in which.

The drawings and the description hereinafter contain elements of a certain nature. They can therefore not only be used to better understand the present invention, but also contribute to the definition thereof, where appropriate.

The present description is of a nature such that it makes use of elements capable of protection by royalties and/or copyright. The owner of the rights has no objection to the identical reproduction by anyone of the present patent document or its description, as it appears in official records. For the rest, the owner reserves full rights.

Furthermore, the detailed description is supplemented in appendix A, which gives the formulation of certain mathematical formulae implemented within the scope of the invention. Said appendix is set aside for clarification purposes, and to facilitate the returns. It is an integral part of the description, and therefore cannot only be used to better understand the present invention, but also to contribute to its definition, where appropriate.

Figure 1:
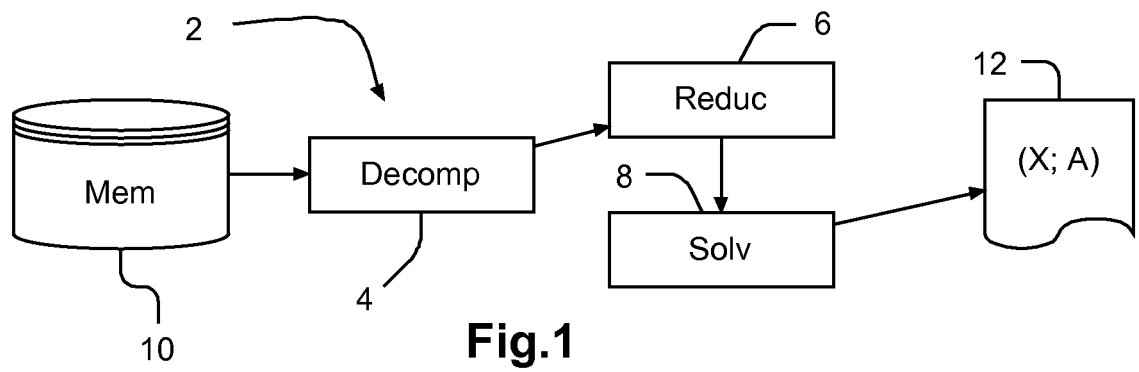
FIG. 1 shows an embodiment of a device according to the invention.

FIG. 1 shows an embodiment of a device according to the invention.

The device 2 comprises a decomposer 4, a reducer 6, a solver 8 and a memory 10.

In the example described herein, the device 2 is implemented on a computer that receives localization data. This computer is herein of the PC type provided with the operating system Windows 7, and a graphics card capable of managing one or more displays. Of course, it may be made differently, with a different operating system, with wired or wireless communication with the one or more displays. The term "computer" should be interpreted in the broad sense of the term. For example, it could be a tablet or a smartphone, an interaction terminal with a computing server, or an element on a distributed resource grid, etc.

The decomposer 4, the reducer 6 and the solver 8 here are programs executed by the processor of the computer. Alternatively, one or more of these elements could be implemented differently using a dedicated processor. The processor should be understood as any processor adapted to the data processes described below. Such a processor may be made in any known way, in the form of a microprocessor for a personal computer, a dedicated chip of the FPGA Or SoC ("System on Chip"), a computing resource on a grid, a microcontroller, or any other form capable of providing the computational power necessary for the implementation described below. One or more of these elements may also be embodied as specialized electronic circuits such as an ASIC. A combination of processor and electronic circuitry may also be contemplated.

The memory 10 may be any type of data storage capable of receiving digital data: hard disk, flash memory hard disk (SSD), flash memory in any form, random access memory, magnetic disk, locally distributed or cloud distributed storage, etc. The data calculated by the device 2 can be stored on any type of memory similar to or on the memory 10. This data can be deleted after the device has performed its tasks or can be kept.

The device 2 receives as input data distances between a plurality of anchors and a plurality of sources. These distances are connected to the coordinates of the anchors and the sources. Traditionally, this type of problem is addressed by seeking to solve the distance-related quadratic equations.

The Applicant has discovered that by using the Euclidean distance matrix between the sources A and the anchors X, it is possible to completely solve the coordinates of the anchors X and of the sources A, as soon as there are at least 4 anchors and at least 10 mobile sources, the number of anchors and movable sources being switchable.

In the context of the invention, the notion of mobile sources must be understood in the sense of the location of such sources. Indeed, it is the distances between 10 distinct locations and 4 anchors (or the inverse) that make it possible to determine the coordinates of the anchors and of the sources. Thus, there may be a single mobile source that moves relative to the anchors (e.g., a drone, or a user moving with his mobile phone), and ten measurements at ten distinct locations of this single mobile source. Of course, there may be a mixture of both. For example, the distance data may relate to a single distance measurement with respect to 4 anchors for 8 distinct mobile sources, and two distance measurements with respect to the 4 anchors for another mobile source, or a single distance measurement with respect to 4 anchors for 6 distinct mobile sources, and two distance measurements with respect to the 4 anchors for two other mobile sources, etc.

Subsequently, the matrix of the Euclidean distances between the sources A and the anchors X will be referred to with the expression Edm (X, A). Thus, the device 2 returns localization data 12 that describes the exact coordinates of the anchor matrices X and mobile sources A in a selected data repository.

The method provided in the invention comprises suppressing the quadratic terms of the Euclidean distance matrix to reduce the problem of determining a transformation matrix C and a translation vector $(A_1-X_1)$, and separating the variables into X and A by dealing with the left part of the matrix of the Euclidean distances and with the right part of the matrix of the Euclidean distances separately. The combination of these two principles leads to a least squares problem which can be solved if the conditions relating to the number of anchors and the number of mobile sources is respected. Once this problem is solved, it is possible to extract X and A by choosing a suitable reference frame.

The equations [10] and [15] represent the matrix X of anchors, the matrix A of mobile sources, the matrix D of distances between anchors and mobile sources, and the Euclidean distance matrix Edm (X, A). Equation [20] describes the singular value decomposition of the product of the matrix of the Euclidean distances between the matrices X and A multiplied respectively by a matrix $J_N$ with a dimension of N*N, and a matrix $J_M$ with a dimension of M*M. The matrices $J_N$ and $J_M$ are explained in equation [22]. The equation [25] uses the singular value decomposition of equation [20] for matrix products $J_N X$ and $J_M A$. Equation [30] re-expresses the second line of the equation by re-writing it to put forward a $(A_1-X_1)$ factorisation.

The equation [35] expresses a relationship between the Euclidean distance matrix and the $J_N X$ matrix product and can be demonstrated from the D matrix and equation [10]. The equations [40] and [45] express two other equalities which, when re-injected into equation [35], make it possible to reformulate it according to equation [50]. It will be noted that the product in the right-hand side of equation [40] is a Khatri-Rao product with line partitioning (see equation [42], where the matrices have m lines and ⊗ designates the Kronecker product), and that the matrix D3 of equation [45] is the replication matrix of dimension 3 which makes it possible to obtain vec(A) from vech(A) and is shown exhaustively in equation [47], the functions vec( ) and vech( ) being the vectorisation operators.

Thus, equation [50] represents an equation system that can be solved with the least squares method, the unknown being formed by the second member of the left-hand side, since the first element of the left-hand side and the right-hand side are known.

The solution to equation [50] is represented with equation [55], which can be solved as presented with equation [60]. Once this is done, the result can be fed back into equation [30] to recover the matrices of anchors X and mobile sources A.

Figure 2:
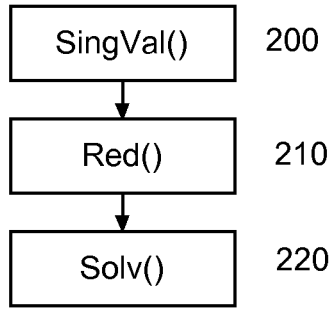
FIG. 2 shows an example of a locating function implemented by the device of FIG. 1.

FIG. 2 represents an example of a locating function implemented by the device of FIG. 1.

The function starts in an operation 200 by singular value decomposition of the matrix product of equation [20], via the execution of a SingVal( ) function by the decomposer 4

Figure 3:
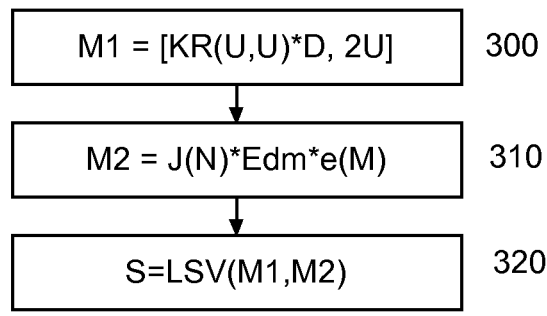
FIG. 3 shows an exemplary implementation of an operation of FIG. 2.
Figure 4:
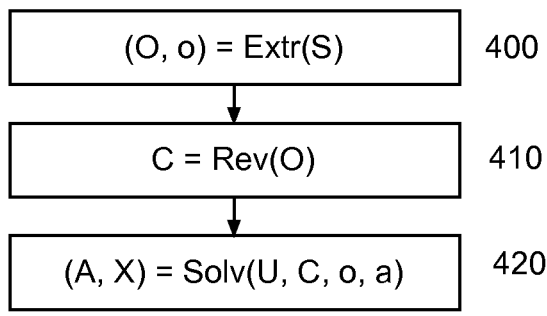
FIG. 4 shows an exemplary implementation of another operation of FIG. 2.

Then, in an operation 210, the reducer 6 executes a Red( ) function. The Red( ) function performs the calculations making it possible to define the problem of equation [50]. FIG. 3 represents an example of implementation of the Red( ) function.

The Red( ) function starts in an operation 300 by calculating the first element of the left-hand side of the equation

[50]. In order to do so, the Khatri-Rao product with itself of the U matrix determined in operation 200 is calculated, and twice the opposite side of the U matrix is horizontally concatenated with it.

Then, in an operation 310, the right-hand side of the equation [50] is calculated, using the $J_N$ matrices and the $e_M$ vector, the $J_N$ matrix having already been defined, and the $e_M$ vector being a vector of dimension M whereof all the elements are null, except the first which is equal to 1.

Finally, in an operation 320, the least squares problem is solved by an LSV( ) function in order to determine the vector S of equation [55]. A study of the problem of equation [50] shows that an infinity of solutions exists, up to an orthogonal rotation. It is therefore necessary to set conditions on the reference frame on which it is desired to express the matrices X and A in order to determine a solution in said reference frame. In order to discuss these solutions, the transformation matrix C is subsequently described in the form of columns, and the U matrix in the form of lines, as explicitly shown in equation [62].

Equation [65] (respectively [75], [85]) defines a reference frame definition set, and equation [70] (respectively [80] and [90]) defines the corresponding solution matrix C:

in the case of the equation [65], the premise is that the anchor $X_1$ is the origin of the reference frame, that the anchor $X_2$ is in the plane (x; z) of the reference frame, and that the mobile source A1 has the coordinates (a1; 0; 0), $1_{max}$ being the highest singular value of the decomposition into eigenvectors of the matrix L of the equation [70], and $E_{1max}$ being the corresponding eigenvector, in the case of equation [75], the premise is that the anchor $X_1$ is the origin of the reference frame, that the anchor $X_2$ has for coordinates (x2; 0; 0), and that the mobile source A1 has coordinates (a1; 0; 0), $1_{max}$ being the highest singular value of the decomposition into eigenvectors of the matrix L of equation [80], and $E_{1max}$ being the corresponding eigenvector, and in the case of equation [85], the premise is that the anchor $X_1$ is the origin of the reference frame, that the anchor $X_2$ has for co-ordinates (x2; 0; 0), and that the anchor $X_3$ has the coordinates (x3; y3; 0), and the operator "x" of the equation [90] designates the vector product.

A person skilled in the art will be able to identify other conditions for setting the reference frame, and the corresponding solutions, depending on the situation.

The invention makes it possible to fully determine the matrices X and A from only the matrix of the distances D, thereby making it possible to perform highly precise localization from a restricted set of data.

---

ANNEX A $$X = \begin{bmatrix} X_1 \\ \cdots \\ X_N \end{bmatrix} = \begin{bmatrix} x_{1,1} & \cdots & x_{1,3} \\ \vdots & \ddots & \vdots \\ x_{N,1} & \cdots & x_{N,3} \end{bmatrix}; A = \begin{bmatrix} A_1 \\ \cdots \\ A_M \end{bmatrix} = \begin{bmatrix} a_{1,1} & \cdots & a_{1,3} \\ \vdots & \ddots & \vdots \\ a_{M,3} & \cdots & a_{M,3} \end{bmatrix} \quad [10]$$

$$D = \begin{bmatrix} \|X_1 - A_1\|_2 & \cdots & \|X_1 - A_M\|_2 \\ \vdots & \ddots & \vdots \\ \|X_N - A_1\|_2 & \cdots & \|X_N - A_M\|_2 \end{bmatrix}; Edm(X, A) = \begin{bmatrix} \|X_1 - A_1\|_2^2 & \cdots & \|X_1 - A_M\|_2^2 \\ \vdots & \ddots & \vdots \\ \|X_N - A_1\|_2^2 & \cdots & \|X_N - A_M\|_2^2 \end{bmatrix} \quad [15]$$

$$J_N Edm(X,A) J_M^T = UVW \quad [20]$$

$$J_N = \begin{bmatrix} 0 & \cdots & \cdots & \cdots & 0 \\ -1 & 1 & 0 & \ddots & \vdots \\ \vdots & 0 & \ddots & \ddots & \vdots \\ \vdots & \vdots & \ddots & \ddots & \vdots \\ \vdots & \vdots & \ddots & \ddots & 0 \\ -1 & 0 & \cdots & 0 & 1 \end{bmatrix} \quad J_M = \begin{bmatrix} 0 & \cdots & \cdots & \cdots & 0 \\ -1 & 1 & 0 & \ddots & \vdots \\ \vdots & 0 & \ddots & \ddots & \vdots \\ \vdots & \vdots & \ddots & \ddots & \vdots \\ \vdots & \vdots & \ddots & \ddots & 0 \\ -1 & 0 & \cdots & 0 & 1 \end{bmatrix} \quad [22]$$

$$\begin{cases} J_N X = X - 1_N X_1 \\ J_M A = A - 1_M A_1 \end{cases} \Rightarrow \begin{cases} J_N X = UC \\ J_M A = -\frac{1}{2}(VW)^T C^{-T} \end{cases} \quad [25]$$

$$A - 1_M A_1 = A - 1_M X_1 - 1_M(A_1 - X_1) \Rightarrow \begin{cases} X - 1_N X_1 = UC \\ A - 1_M X_1 = -\frac{1}{2}(VW)^T C^{-T} + 1_M(A_1 - X_1) \end{cases} \quad [30]$$

$$J_N EDM(X,A)_{e_M} = \text{diag}((J_N X)(J_N X)^T)) - 2 J_N X (A_1 - X_1)^T \quad [35]$$

$$\text{diag}(AXB) = (B^T \boxtimes A)\text{vec}(X) \quad [40]$$

$$A \boxtimes B = \begin{bmatrix} A_1 \otimes B_1 \\ \vdots \\ A_m \otimes B_m \end{bmatrix} \quad [42]$$

$$\text{diag}((UC)(UC)^T) = (U \boxtimes U)\text{vec}(CC^T) = (U \boxtimes U) D_3 \text{vech}(CC^T) \quad [45]$$

-continued

ANNEX A $$D_3 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 1 & 0 & 0 & 0 & 0 \\ 0 & 0 & 0 & 1 & 0 & 0 \\ 0 & 0 & 0 & 0 & 1 & 0 \\ 0 & 0 & 1 & 0 & 0 & 0 \\ 0 & 0 & 0 & 0 & 1 & 0 \\ 0 & 0 & 0 & 0 & 0 & 1 \end{bmatrix}$$ [47]

$$[(U \boxtimes U)D_d \quad -2U] \begin{bmatrix} vech(CC^T) \\ C(A_1 - X_1)^T \end{bmatrix} = J_N EDM(X, A)e_M$$ [50]

$$S = \begin{bmatrix} \Theta \\ \theta \end{bmatrix} = \begin{bmatrix} vech(CC^T) \\ C(A_1 - X_1)^T \end{bmatrix}$$ [55]

$$CC^T = \Theta \Rightarrow (A_1 - X_1)^T = C^{-1}\theta$$ [60]

$$C = [C_1 \quad C_2 \quad C_3]; U = \begin{bmatrix} U_1 \\ U_2 \\ U_3 \end{bmatrix}$$ [62]

$$\begin{cases} CC^T = \begin{bmatrix} \theta_1 & \theta_2 & \theta_3 \\ \theta_2 & \theta_4 & \theta_5 \\ \theta_3 & \theta_5 & \theta_6 \end{bmatrix} \\ d_{1,1}C_1 = \begin{bmatrix} \theta_7 \\ \theta_8 \\ \theta_9 \end{bmatrix} \\ U_2 C_2 = 0 \end{cases}$$ [65]

$$C_1 = \frac{\theta}{d_{1,1}}; C_2 = \sqrt{l_{max}} E_{l_{max}}; C_3 = \frac{QU_2^T}{\sqrt{U_2 Q U_2^T}} \text{ with } L = Q - \frac{QU_2^T U_2 Q}{U_2 Q U_2^T} \text{ and } Q = \Theta - \frac{\theta \theta^T}{d_{1,1}^2}$$ [70]

$$\begin{cases} CC^T = \begin{bmatrix} \theta_1 & \theta_2 & \theta_3 \\ \theta_2 & \theta_4 & \theta_5 \\ \theta_3 & \theta_5 & \theta_6 \end{bmatrix} \\ d_{1,1}C_1 = \begin{bmatrix} \theta_7 \\ \theta_8 \\ \theta_9 \end{bmatrix} \\ U_2 C_3 = 0 \end{cases}$$ [75]

$$C_1 = \frac{\theta}{d_{1,1}}; C_2 = \frac{QU_2}{\sqrt{U_2^T Q U_2}}; C_3 = \sqrt{l_{max}} E_{l_{max}} \text{ with } L = Q - \frac{QU_1 U_1^T Q}{U_1^T Q U_1} \text{ and } Q = \Theta - \frac{\theta \theta^T}{d_{1,1}^2}$$ [80]

$$\begin{cases} CC^T = \begin{bmatrix} \theta_1 & \theta_2 & \theta_3 \\ \theta_2 & \theta_4 & \theta_5 \\ \theta_3 & \theta_5 & \theta_6 \end{bmatrix} \\ U_2 C_2 = 0 \\ U_2 C_3 = 0 \\ U_3 C_3 = 0 \end{cases}$$ [85]

$$C_1 \frac{\theta U_2^T}{\sqrt{U_2 \theta U_2^T}}; C_2 = \frac{\beta U_3^T}{\sqrt{U_3 \theta U_3^T}} \text{ with } \beta = \frac{\theta U_2^T U_2 \theta}{U_2 \theta U_2^T}; C_3 = \frac{u}{\sqrt{u^T \theta^{-1} u}} \text{ with } u = U_2^T x U_3^T$$ [90]

The invention claimed is:

1. A locating device comprising:
   a memory arranged to receive data concerning a distance between a plurality of anchors and one or more mobile sources at a plurality of locations different from one another, the number of anchors and the number of locations satisfying a criteria that one must be higher than four and is designated as a primary number and the other one must be higher than ten and is designated as a secondary number,
   a decomposer arranged to access the distance data and to calculate a singular value decomposition of a matrix formed by a product of the Euclidean distance matrix derived from the distance data multiplied by two square matrices one of which has a dimension equal to the primary number squared and has a first line of null elements, a first column of elements which are equal to minus one except a first element which is null, the other elements forming an identity matrix which order is equal to the primary number minus 1, and the other square matrix is a transpose of a matrix with a dimension equal to the secondary number squared having a first row of null elements, a first column of elements which are equal to minus one except a first element which is null, the other elements forming an identity matrix which order is equal to the secondary number minus one,
   a reducer arranged to calculate a resolution vector minimizing, according to a least squares method, a difference between the product of a simplification matrix multiplied by the resolution vector and a matrix formed by a product of a Euclidean distance matrix derived from the distance data multiplied by a vector of which all elements are equal to one except a first element which is null, and by a vector of which all elements are null except a first which is equal to one, the simplification matrix being derived from a multiplication between a Khatri-Rao product by line partitioning of a first matrix of the singular value decomposition performed by the decomposer with itself and a replication matrix having a dimension equal to three, concatenated with twice the opposite of the first matrix of the singular value decomposition performed by the decomposer,
   a solver arranged to derive an inversion vector from a last three elements of the resolution vector and an inversion matrix formed from the other elements of the resolution vector, in order to determine a transformation matrix such that the inversion matrix is equal to a product of the transformation matrix by its transpose, and to return a matrix of coordinates of the anchors and a matrix of coordinates of the locations from the transformation matrix, the inversion vector, the first matrix of the singular value decomposition performed by the decomposer and a product of a second matrix and of a third matrix of the singular value decomposition performed by the decomposer.

2. The device according to claim 1, wherein the solver is arranged to determine the transformation matrix as an aggregation of three three-dimensional vectors, a first of which is the inversion vector divided by a distance between the first anchor and a first mobile source, a second of which is derived from a singular values vector of a matrix calculated from a second line of the first matrix of the singular value decomposition performed by the decomposer, the inversion vector and the inversion matrix, and a third of which is calculated from the second line of the first matrix of the singular value decomposition performed by the decomposer, the inversion vector and the transformation matrix.

3. The device according to claim 1, wherein the solver is arranged to determine the transformation matrix as an aggregation of three three-dimensional vectors, a first of which is the inversion vector divided by a distance between a first anchor and a first mobile source, a second of which is calculated from a second line of the first matrix of the singular value decomposition performed by the decomposer, the inversion vector and the inversion matrix, and a third of which is derived from a singular values vector of a matrix calculated from the second line of the first matrix of the singular value decomposition performed by the decomposer, the inversion vector, and the inversion matrix.

4. The device according to claim 1, wherein the solver is arranged to determine the transformation matrix as an aggregation of three three-dimensional vectors, a first of which is calculated from the inversion matrix and a second row of the first matrix of the singular value decomposition performed by the decomposer, a second of which is calculated from the inversion matrix, a second line of the first matrix of the singular value decomposition performed by the decomposer and a third line of the first matrix of the singular value decomposition performed by the decomposer, and a third of which is formed from the inversion matrix and a vector product between a transpose of the second line of the first matrix of the singular value decomposition performed by the decomposer and a transpose of a third line of the first matrix of the singular value decomposition performed by the decomposer.

5. The device according to claim 1, in which the solver is further arranged to calculate a reference frame change matrix between coordinates of three anchors in an absolute reference frame and the coordinates of these three anchors in the anchor coordinate matrix determined by the solver, and to return an absolute coordinate matrix of the locations from the reference frame change matrix and the coordinate matrix of the locations determined by the solver.

6. A computer-implemented locating method comprising:
   a) receiving data concerning a distance between a plurality of anchors and one or more mobile sources at a plurality of locations different from one another, the number of anchors and the number of locations satisfying a criteria that one must be higher than four and is designated as a primary number and the other one must be higher than ten and is designated as a secondary number,
   b) calculating a decomposition, into singular values, of a matrix formed by a product of a Euclidean distance matrix derived from the distance data multiplied by two square matrices, one of which has a dimension equal to the primary number squared and has a first row of null elements, a first column of elements which are equal to minus one except a first element which is null, the other elements forming an identity matrix which order is equal to the primary number minus one, and the other square matrix is a transpose of a matrix with a dimension equal to the secondary number squared having a first row of null elements, a first column of elements which are equal to minus one except a first element which is null, the other elements forming an identity matrix the order of which is equal to the secondary number minus one,
   c) calculating a resolution vector minimizing, according to a least squares method, the difference between a product of a simplification matrix multiplied by the resolution vector and a matrix formed by a product of a Euclidean distance matrix derived from the distance data multiplied by a vector of which all the elements are equal to one except a first element which is null, and by a vector of which all the elements are null except a first which is equal to one, the simplification matrix being derived from a multiplication between a Khatri-Rao product by line partitioning of a first matrix of the singular value decomposition of the operation b) with itself and a replication matrix having a dimension equal to three, horizontally concatenated with twice the opposite of the first matrix of the singular value decomposition of step b), d) drawing an inversion vector from a last three elements of the resolution vector and an inversion matrix formed from the other elements of the resolution vector, e) determining a transformation matrix such that the inversion matrix is equal to a product of the transformation matrix by its transpose, and f) returning a matrix of coordinates of the anchors and a matrix of coordinates of the locations from the transformation matrix, the inversion vector, the first matrix of the singular value decomposition of the operation b) and a product of a second matrix and a third matrix of the singular value decomposition of the operation b).

7. The method according to claim 6, wherein the operation e) determines the transformation matrix as an aggregation of three three-dimensional vectors, a first of which is the inversion vector divided by a distance between a first anchor and a first mobile source, a second of which is derived from a vector of singular values of a matrix calculated from a second line of the first matrix of the singular value decomposition of the operation b), the inversion vector and the inversion matrix, and a third of which is calculated from the second line of the first matrix of the singular value decomposition of the operation b), the inversion vector, and the inversion matrix.

8. The method according to claim 6, wherein the operation e) determines the transformation matrix as an aggregation of three three-dimensional vectors, a first of which is the inversion vector divided by a distance between a first anchor and a first mobile source, a second of which is calculated from a second line of the first matrix of the singular value decomposition of the operation b), the inversion vector and the inversion matrix, and a third of which is derived from a singular values vector of a matrix calculated from the second line of the first matrix of the singular value decomposition of the operation b), the inversion vector, and the inversion matrix.

9. The method according to claim 6, wherein the operation e) determines the transformation matrix as an aggregation of three three-dimensional vectors, a first of which is calculated from the inversion matrix and a second row of the first matrix of the singular value decomposition of the operation b), a second is calculated from the inversion matrix, the second row of the first matrix of the singular value decomposition of the operation b) and a third line of the first matrix of the singular value decomposition of the operation b), and a third of which is formed from the inversion matrix and a vector product between a transpose of a second line of the first matrix of the singular value decomposition of the operation b) and a transpose of a third line of the first matrix of singular value decomposition of the operation b).

10. The method according to claim 6, further comprising the following operation:

g) calculating a reference frame change matrix between coordinates of three anchors in an absolute reference frame and the coordinates of these three anchors in the anchor coordinate matrix determined by the solver, and returning an absolute coordinate matrix of the locations from the reference frame change matrix and a coordinate matrix of mobile sources determined by the solver.

11. A non-transitory computer-readable medium comprising a computer program product, which comprises program code instructions for executing a locating method, when the instructions are executed by a processor of a locating device, wherein the instructions configure the locating device to:

a) receive data concerning a distance between a plurality of anchors and one or more mobile sources at a plurality of locations different from one another, the number of anchors and the number of locations satisfying a criteria that one must be higher than four and is designated as a primary number and the other one must be higher than ten and is designated as a secondary number, b) calculate a decomposition, into singular values, of a matrix formed by a product of a Euclidean distance matrix derived from the distance data multiplied by two square matrices, one of which has a dimension equal to the primary number squared and has a first row of null elements, a first column of elements which are equal to minus one except a first element which is null, the other elements forming an identity matrix which order is equal to the primary number minus one, and the other square matrix is a transpose of a matrix with a dimension equal to the secondary number squared having a first row of null elements, a first column of elements which are equal to minus one except a first element which is null, the other elements forming an identity matrix the order of which is equal to the secondary number minus one, c) calculate a resolution vector minimizing, according to a least squares method, the difference between a product of a simplification matrix multiplied by the resolution vector and a matrix formed by a product of a Euclidean distance matrix derived from the distance data multiplied by a vector of which all elements are equal to one except a first element which is null, and by a vector of which all elements are null except a first which is equal to one, the simplification matrix being derived from a multiplication between a Khatri-Rao product by line partitioning of a first matrix of the singular value decomposition of the operation b) with itself and a replication matrix having a dimension equal to three, horizontally concatenated with twice the opposite of the first matrix of the singular value decomposition of step b), d) draw an inversion vector from last three elements of the resolution vector and an inversion matrix formed from the other elements of the resolution vector, e) determine a transformation matrix such that the inversion matrix is equal to a product of the transformation matrix by its transpose, and f) return a matrix of coordinates of the anchors and a matrix of coordinates of the locations from the transformation matrix, the inversion vector, the first matrix of the singular value decomposition of the operation b) and a product of a second matrix and a third matrix of the singular value decomposition of the operation b).

\* \* \* \* \*